United States Patent [19]

Brand et al.

[11] Patent Number: 4,488,465
[45] Date of Patent: Dec. 18, 1984

[54] METHOD AND APPARATUS FOR CUTTING OPEN-FLANKED OR OPEN-SIDED V-BELTS

[75] Inventors: Wilhelm Brand; Hans Hersing; Dietmar Baasner, all of Hanover, Fed. Rep. of Germany

[73] Assignee: Hermann Berstorff Maschinenbau GmbH, Hanover, Fed. Rep. of Germany

[21] Appl. No.: 395,924

[22] Filed: Jul. 7, 1982

[30] Foreign Application Priority Data

Jul. 16, 1981 [DE] Fed. Rep. of Germany ....... 3128110

[51] Int. Cl.³ .............................................. B29H 7/22
[52] U.S. Cl. ...................................... 83/175; 83/187; 83/432; 83/925 EB
[58] Field of Search .................... 83/925 EB, 432, 869, 83/39, 54, 56, 187, 175, 18

[56] References Cited

U.S. PATENT DOCUMENTS

| 323,483 | 8/1885 | Wright | 83/432 X |
| 1,611,781 | 12/1926 | Russell | 83/432 X |
| 3,608,412 | 9/1971 | Braden et al. | 83/432 X |
| 3,701,186 | 10/1972 | Kuts | 83/925 EB |
| 3,791,243 | 2/1974 | Holinski | 83/925 EB |
| 4,248,110 | 2/1981 | Spivy | 83/925 EB |

FOREIGN PATENT DOCUMENTS

| 2004145 | 1/1970 | Fed. Rep. of Germany . | |
| 51541 | 4/1980 | Japan | 83/925 EB |
| 28270 | of 1910 | United Kingdom | 83/432 |

*Primary Examiner*—James M. Meister
*Attorney, Agent, or Firm*—Schwartz, Jeffery, Schwaab, Mack, Blumenthal & Koch

[57] ABSTRACT

A method and an apparatus are provided for cutting open-flanked V-belts, for example, for use as fan belts in automobiles. Individual V-belts are cut from a vulcanized roll formed from a plurality of layers of rubber and reinforcements. The roll is rotatably disposed on support devices, the support devices being so arranged that at least a portion of the rotation of the roll occurs in straight lines. The belts are cut in the straight line regions. Extremely uniform flank cuts are achieved thereby. The straight line is defined between two rollers, over which the vulcanized roll is forced and becomes tensioned. Cutting devices are moved into and out of the straight line portion of the rotational path of the roll in order to produce the flank cuts.

1 Claim, 3 Drawing Figures

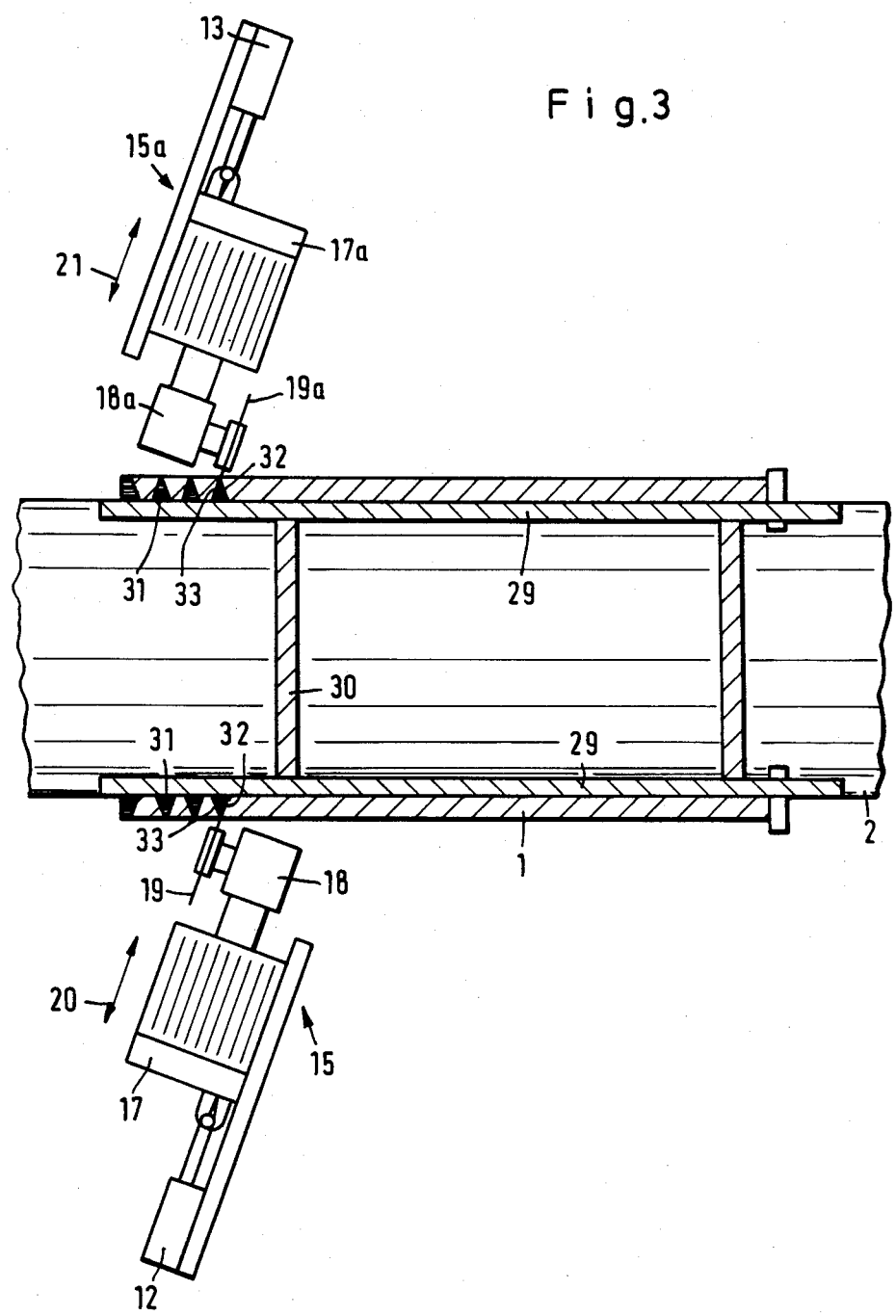

METHOD AND APPARATUS FOR CUTTING OPEN-FLANKED OR OPEN-SIDED V-BELTS

FIELD OF THE INVENTION

The present invention relates to a method and an apparatus for cutting open-flanked or open-sided V-belts from a tubular, vulcanised roll formed from a plurality of layers of rubber and reinforcement materials.

BACKGROUND OF THE INVENTION AND DESCRIPTION OF PRIOR ART

Coated V-belts are manufactured individually. Open-flanked V-belts, on the other hand, are produced from a tubular roll which is coiled up from a plurality of layers of coils provided with reinforcement strands or cords. The roll is vulcanised. The roll is then cut into individual V-belts.

A method and a device for manufacturing open-flanked V-belts is known and described in German Patentschrift No. 2 004 145. The tubular roll is fashioned from a plurality of rubber layers and is located on a drum. An adhesive rubber layer is then applied thereto and a layer of thread is spun thereon, this layer being formed of, for example, a polyamide, a polyester, artificial silk, cotton, glass fibres or a similar material. A rubber layer generally forms the outer covering of the roll. The drum, having the roll located thereon, is then inserted into a vulcanisation apparatus and, after the vulcanisation process, the roll is pushed onto a cutting drum to be cut up into individual V-belts.

The cutting operation occurs whilst the roll is on the drum and is often beset with problems. Circular cutters are generally and preferably used which are driven at high peripheral speeds. However, the cutters are considerably retarded and hence intensely heated by the already severed inclined flanks of the V-belts on the curved cutting drum. This causes the flanks of the belts to become misshapen and the belts therefore have an inaccurate rate configuration. As a result of extensive tests and calculations, it has surprisingly been found that the retardation effect always occurs when an inclined cut is made by means of circular cutters rotating on a curved surface in a layer which rotates with the curved surface. This is because the circular cutters rotating on a curved surface, in a layer which rotates with the curved surface. This is because the circular cutter is retarded by the flanks of the portion already cut on the rounded section of the support drum. The circular cutter is retarded because the circular path of the inclined cutter and the rotational path of the already severed flank of the V-belt around the drum intersect slightly.

This very serious problem can be avoided by making the inclined flank cut as a draw cut using vertical cutters. However, practical experiments have shown that flank cuts which are made in this way do not meet the requirements governing their precision.

With regard to the cutting of already vulcanised, open-flanked V-belts, it is vitally important that very exact and extremely uniform cuts are made. This is because a vulcanised V-belt is not deformable. Allowances can be made, to some extent, for inaccurate cuts in V-belts which have not yet been vulcanised during the subsequent vulcanisation process. This is impossible, however, with vulcanised V-belts. Maximum precision and accuracy are needed for cutting vulcanised V-belts, and such cutting cannot, in any way, be compared with the cutting of unvulcanised, relatively soft or pliant material.

OBJECTS OF THE INVENTION

The present invention seeks to provide a method and an apparatus for cutting unvulcanised open-flanked V-belts which permits very precise and entirely uniform flank cuts to be achieved. At the same time, it is desired to provide a method and apparatus which improve the cutting output.

SUMMARY OF THE INVENTION

According to the present invention, there is provided a method of cutting open-flanked or open-sided V-belts from a tubular, vulcanised roll, formed from a plurality of layers of rubber and reinforcements, wherein the vulcanised, tubular roll is displaceably guided in such a manner that at least part of the displacement of the belt occurs in straight lines, making a plurality of flank cuts in the belt in said straight line displacement regions and cutting the flank-cut belt into a plurality of individual V-belts.

By guiding the rotating roll such that portions of it extend in a straight line and making the flank cuts in the straight-line portions outstandingly uniform flank cuts are achieved without any possibility of the circular cutter having any retardation effect on the already severed, upper flank portions. This is because the paths of the flanks and of the circular cutters do not intersect. The elimination of the retardation effect simultaneously eliminates any vibration of the cutters so that extremely smooth, uniform flank cuts can be achieved.

Only very uniformly cut, open-flanked V-belts ensure extremely smooth running in such uses as, for example, fan belts in motor vehicles, and hence ensure a long service-life.

Also according to the present invention there is provided an apparatus for cutting open-flanked or open-sided V-belts from a tubular, vulcanised roll formed from a plurality of layers of rubber and reinforcements comprising support means for said roll, said support means comprising a pair of drivable rollers, at least one of said rollers being capable of being displaced in an axially-parallel manner with respect to the other of said rollers, said displacement of said at least one roller away from said other roller causing said roll to be tensioned and causing at least a part of the displacement of said belt to occur in straight lines when said rollers are driven and cutter means displaceable into and out of said straight line displacement portions of said rotating roll for effecting flank cuts in said roll.

Preferably, the cutter member of the cutting apparatus is either in the form of a drivable circular cutter or a drivable vertical cutter.

An abutment member for the circular cutters is advantageously arranged below the straight line portion of the rotational path of the roll. Desirably, the apparatus comprises a circular cutter which is driven by an angular drive, the drive having a motor flange-mounted thereon, the motor being mounted on a displaceable carrier.

BRIEF DESCRIPTION OF THE DRAWINGS

One embodiment of an apparatus in accordance with the present invention will be further described, by way of example, with reference to the accompanying drawings, in which:

FIG. 3 is a cross-sectional view taken along the line III—III in FIG. 1.

DESCRIPTION OF PREFERRED EMBODIMENT

Figure 1:
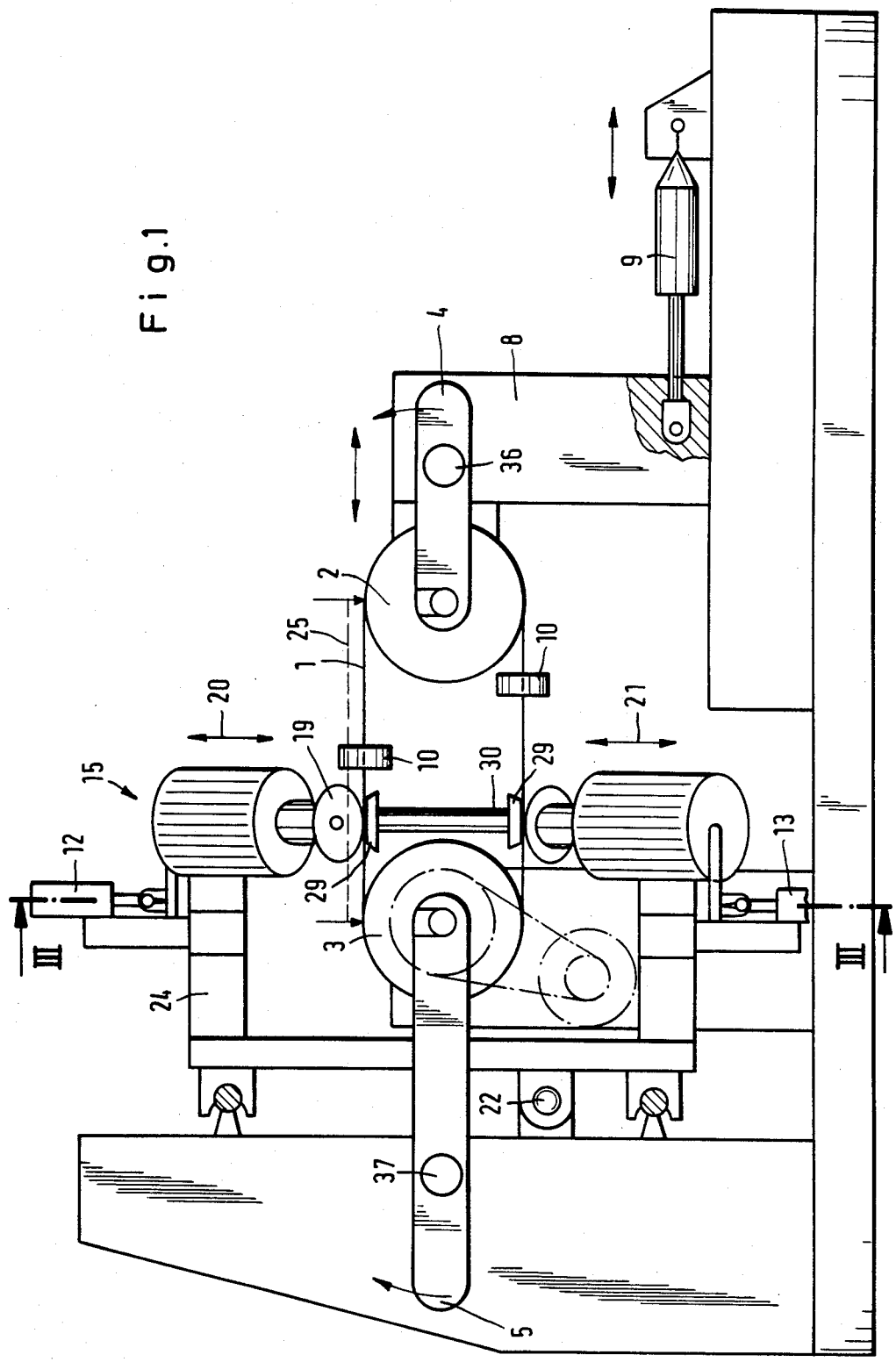
FIG. 1 is a schematic, side elevational view of the apparatus.

In the drawings, there is shown an already produced vulcanised roll 1 which has been forced over a pair of rollers 2 and 3. To permit the roll 1 to be forced over the rollers 2 and 3, bearing arms 4 and 5 respectively for the rollers 2 and 3 are pivotally mounted about axles 36 and 37 respectively. The pivotal movement of the rollers is effected by means of devices which are familiar to those skilled in the art and will not, therefore, be described further.

The rollers 2 and 3 are also mounted in fixed bearings 6 and 7, which fixed bearings are disposed on the side of the apparatus opposite to the bearing arms 4 and 5. Once the roll 1 has been mounted on the rollers 2 and 3, the roller 2, which is mounted in a support 8, is displaced away from the roller 3 by means of hydraulic cylinder 9. This causes the roll 1 to become tensioned.

The roller 3 is then caused to rotate by actuating a drive unit 14 therefor. This rotary motion is transferred to the roller 2 by the tensioned roll 1. The roll 1 is retained in a precise rotational path around rollers 2 and 3 by means of guide rollers 10 and 11 which are arranged laterally of the roll 1.

Cutter units 15 and 15a, best seen in FIG. 3 and which comprisu drive motors 17 and 17a, angular drives 18 and 18a and circular cutter members 19 and 19a, are then actuated. The cutter units 15 and 15a are displaced into a straight line portion 25 of the path of rotating roll 1. Such displacement is effected in the direction of the arrows 20 and 21 respectively by means of pneumatic cylinders 12 and 13. This displacement causes the lateral flank cuts 32 and 33 of the V-belts to be made in the roll. The roll 1 is guided internally by means of support members 29 which members are mounted at the bottom and top ends of a carrier 30. The members 29 also act as abutments for the circular cutter members 19 and 19a.

Figure 2:
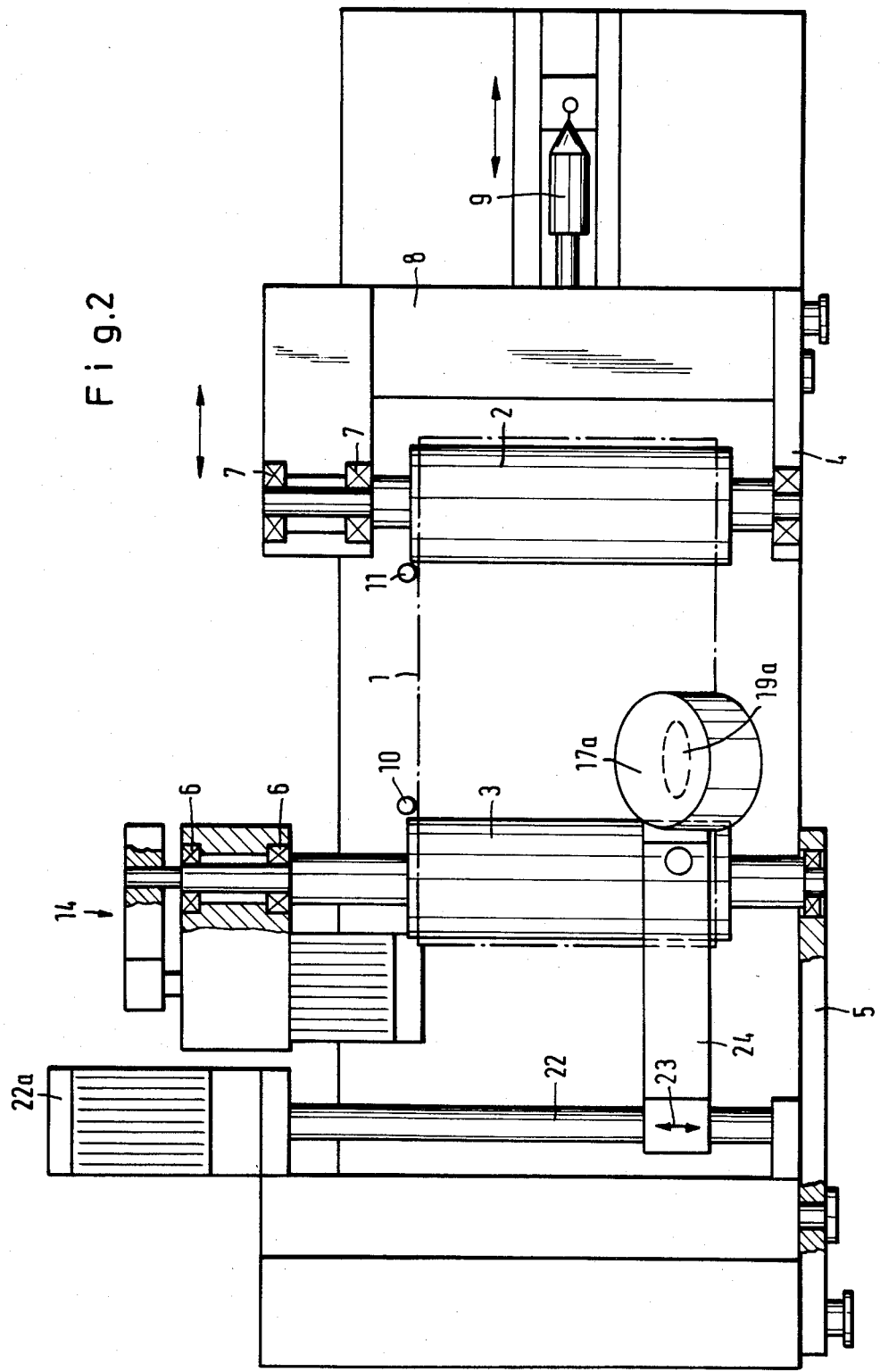
FIG. 2 is a plan view of the apparatus shown in FIG. 1.

The cutter units 15 and 15a are moved out of the rotational path of the roll 1 after each flank cut has been completed in the direction of the arrows 20 and 21. A stepping motor 22a, seen in FIG. 2, is then actuated which rotates the spindle 22. By means of a carrier 24, the cutter units 15 and 15a are displaced laterally by a distance corresponding to the width of one V-belt, such movement being indicated by the arrow 23. By displacing the cutter units 15 and 15a back into the rotational path of the roll 1, in the direction of the arrows 20 and 21, the next flank cut is made, so that a wedge-shaped portion 31 is cut out.

Because of the provision of both an upper cutter unit 15a and a lower cutter unit 15, as shown in FIG. 3, the flank cut 33 is made by the circular cutter member 19a, and the flank cut 32 is made by the circular cutter member 19.

Once the entire width of the roll 1 has been cut up into individual V-belts, the roller 2 is displaced or moved towards the roller 3, again by means of the hydraulic cylinder 9. By pivoting the bearing arm 4 and 5 about their pivotal axles 36 and 37 respectively, it is possible to remove the individual V-belts from the apparatus and to force a new roll 1 over the rollers 2 and 3.

The adverse effects which occur when effecting the cutting operation on a round drum by means of a circular cutter, as described hereinbefore, are avoided by the use of the apparatus in accordance with the present invention. At the same time, the flank cuts can be effected extremely accurately, so that the V-belts which are produced are extremely smooth-running, and hence have a long service-life.

We claim:

1. An apparatus for cutting open-flanked V-belts from a tubular, vulcanized roll formed from a plurality of layers of rubber and reinforcements comprising:
   (a) support means for said roll, said support means comprising a pair of drivable rollers, at least one of said rollers being capable of being axially displaced in a parallel manner with respect to the other of said rollers, said displacement of said at least one roller away from said other roller causing said roll to be tensioned and causing at least a part of the displacement of said belt to occur in straight lines,
   (b) means for axially displacing said at least one roller so as to tension said roll,
   (c) means for rotating said rollers,
   (d) a pair of cutter means mounted generally opposite each other and exteriorly of and between the axes of said rollers, each of said cutter means including a single circular cutter blade, means for rotating said cutter blades, and adjustment means operatively connected to each of said cutter blades for simultaneously moving said blades into engagement with said roll for cutting oppositely angled flank cuts in said roll to form a series of V-belts, and away from engagement with said roll after said cuts have been completed,
   (e) abutment means positioned between said rollers and co-operable with said circular cutter blades, said abutment means being disposed within and supporting said roll when said roll is located on said rollers, and
   (f) means for intermittently and simultaneously moving said pair of cutter means a predetermined distance in a direction parallel to the axes of said rollers when said cutter blades are disengaged so as to position said blades for the next cut, after which said adjustment means can be actuated to move said cutter blades into engagement with said roll to effect additional flank cuts in said roll.

* * * * *